US010969955B2

(12) United States Patent
Zhuang (10) Patent No.: US 10,969,955 B2
(45) Date of Patent: Apr. 6, 2021

(54) ELECTRONIC DEVICE (71) Applicant: Lenovo (Beijing) Co., Ltd., Beijing (CN)

(72) Inventor: Huajun Zhuang, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/237,095

(22) Filed: Dec. 31, 2018

(65) Prior Publication Data
US 2019/0205007 A1 Jul. 4, 2019

(30) Foreign Application Priority Data
Jan. 2, 2018 (CN) .......................... 201810001792.2

(51) Int. Cl.
| | |
|---|---|
| *G06F 3/0488* | (2013.01) |
| *G06F 3/041* | (2006.01) |
| *H04M 1/725* | (2021.01) |
| *H04M 1/02* | (2006.01) |
| *G06F 1/16* | (2006.01) |
| *H04M 1/23* | (2006.01) |

(52) U.S. Cl.
CPC .......... *G06F 3/0488* (2013.01); *G06F 1/1626* (2013.01); *G06F 3/0412* (2013.01); *H04M 1/0264* (2013.01); *H04M 1/0266* (2013.01); *H04M 1/72569* (2013.01); *H04M 1/23* (2013.01); *H04M 2250/22* (2013.01)

(58) Field of Classification Search
CPC .. H04M 1/0264; G06F 3/0488; G06F 1/1626; G06F 3/0412; G06F 1/1643
See application file for complete search history.

(56) References Cited

U.S. PATENT DOCUMENTS

| | | | |
|---|---|---|---|
| 2002/0122029 A1* | 9/2002 | Murphy | G06F 3/041 345/173 |
| 2014/0191110 A1* | 7/2014 | Holenarsipur | G06F 3/03 250/206 |
| 2014/0232695 A1* | 8/2014 | McGaughan | G06F 3/0426 345/175 |
| 2017/0270342 A1* | 9/2017 | He | G06F 21/32 |
| 2018/0124934 A1* | 5/2018 | Franklin | H01L 29/786 |
| 2019/0005915 A1* | 1/2019 | Liu | G02F 1/136286 |

FOREIGN PATENT DOCUMENTS

| | | |
|---|---|---|
| CN | 204044785 U | 12/2014 |
| CN | 106055159 A | 10/2016 |
| CN | 107123367 A | 9/2017 |
| CN | 107454304 A | 12/2017 |
| CN | 107480502 A | 12/2017 |
| EP | 3229117 A2 | 10/2017 |

* cited by examiner

*Primary Examiner* — Abbas I Abdulselam
(74) *Attorney, Agent, or Firm* — Anova Law Group, PLLC (57) ABSTRACT An electronic device includes a body, a display screen and a notch defining a notch area fixedly arranged at the body, and a sensor. The sensor is configured to obtain a touch input of an operating entity at the notch area.

15 Claims, 9 Drawing Sheets

ELECTRONIC DEVICE

CROSS-REFERENCE TO RELATED APPLICATION

This application claims priority to Chinese Application No. 201810001792.2, filed on Jan. 2, 2018, the entire contents of which are incorporated herein by reference.

FIELD OF THE DISCLOSURE

The present disclosure relates to electronic device technology and, more particularly, to an electronic device and a control method thereof.

BACKGROUND

Currently, having a large display screen is the development trend for electronic devices, such as mobile phones and tablets. Considering that the user has the need to operate buttons, such as the Home button, Back button, and Menu button, a rectangular space is generally included at the bottom of the electronic device. Physical buttons are arranged at the rectangular space and are divided into push buttons and touch buttons.

However, the physical buttons arranged at the bottom of an electronic device often reduce the effective display area of the electronic device. But if the electronic device does not arrange any button, the user experience may be affected. The disclosed methods and systems are directed to solve one or more problems set forth above and other problems.

SUMMARY

In accordance with the disclosure, there is provided an electronic device including a body, a display screen and a notch defining a notch area fixedly arranged at the body, and a sensor. The sensor is configured to obtain a touch input of an operating entity at the notch area.

Also in accordance with the disclosure, there is provided an electronic device including a body, a display screen and a notch defining a notch area fixedly arranged at the body, and a sensor. At least a part of the sensor is arranged at the notch.

Also in accordance with the disclosure, there is provided a method of controlling an electronic device including determining a working state of a sensor arranged at a notch area of the electronic device, obtaining, by the sensor, a touch input of an operating entity at the notch area of the electronic device, and activating another function other than a touch function of the sensor at the notch area of the electronic device.

BRIEF DESCRIPTION OF THE DRAWINGS

Technical solutions of the present disclosure will be described with reference to the drawings. The following drawings merely illustrate embodiments of the present disclosure. Other drawings may be obtained based on the disclosed drawings by those skilled in the art without creative efforts.

DETAILED DESCRIPTION

Hereinafter, embodiments of the present disclosure are described with reference to the drawings. It is apparent that the disclosed embodiments are merely some but not all of the embodiments of the present disclosure. Other embodiments may be obtained based on the embodiments disclosed herein by those skilled in the art without creative efforts, which are within the scope of the disclosure.

The present disclosure provides an improved electronic device that can increase the effective display area of the electronic device having a button function.

Figure 1:
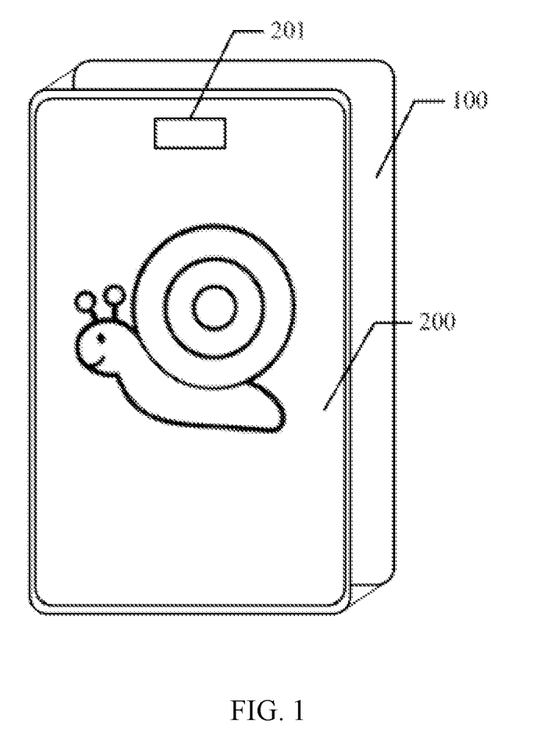
FIG. 1 is a schematic structure diagram of an electronic device according to the disclosure.

FIG. 1 is a schematic structure diagram of an electronic device consistent with the disclosure. As shown in FIG. 1, the electronic device includes a body 100, a display screen 200, a notch 201, and a sensor (not shown), etc. The display screen 200 can be fixedly arranged at the body 100 of the electronic device. The notch 201 defines a notch area. The sensor can be configured to obtain a touch input of an operating entity (e.g., a finger, a stylus, etc.) at the notch area, such that the notch area can have a touch function. The location of the sensor is not shown in FIG. 1.

As shown in FIG. 1, the notch 201 is an opening at a short side of the display screen 200, and the notch 201 is located at an upper part of the body 100. As shown in FIG. 1, the notch 201 has a rectangular shape. In certain embodiment, the position and shape of the notch 201 are not limited to those shown in FIG. 1.

Figure 2A:
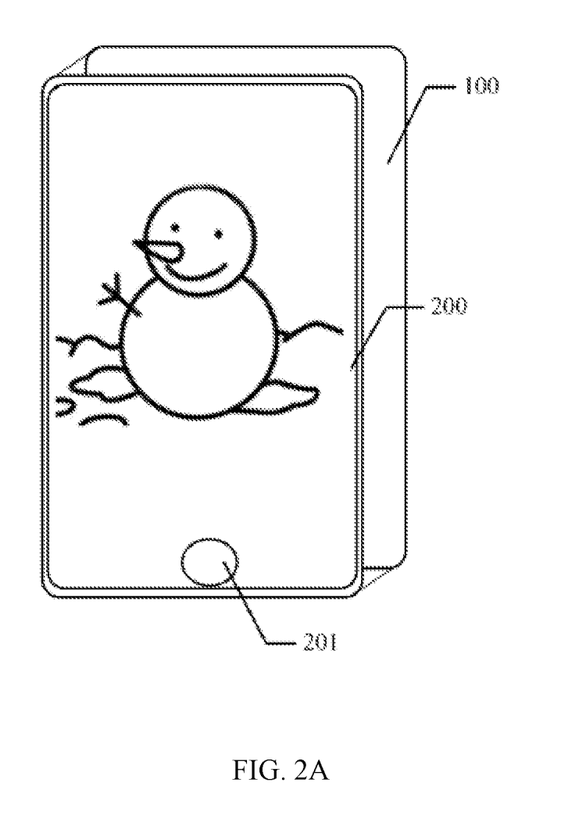
FIG. 2A is a schematic structure diagram of another electronic device according to the disclosure.
Figure 2B:
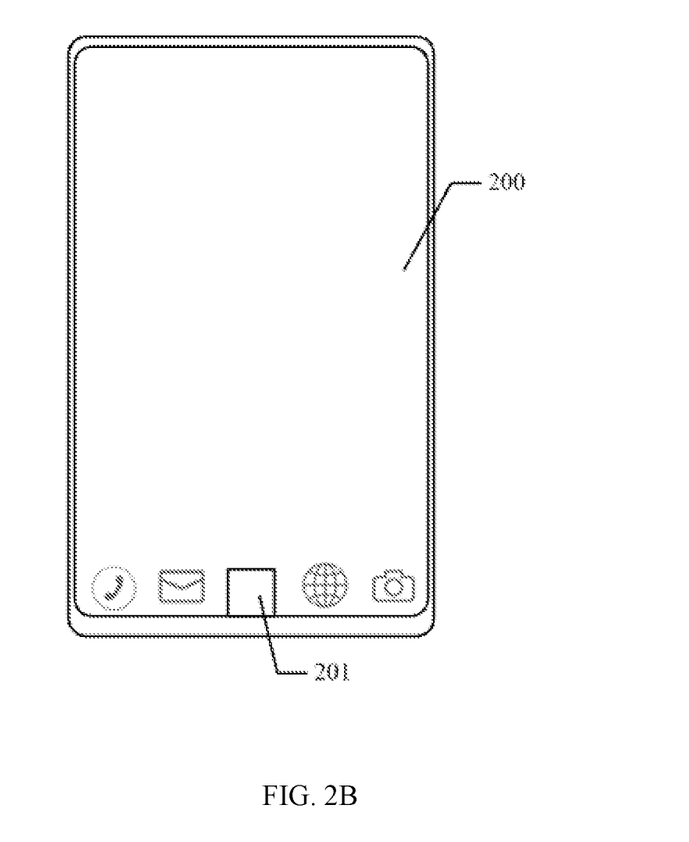
FIG. 2B is a schematic diagram of an interface of an electronic device according to the disclosure.

FIG. 2A is a schematic structure diagram of another electronic device consistent with the disclosure. In certain embodiment, the notch 201 is the opening at the short side of the display screen 200, and the notch 201 is located at a lower part of the body 100 as shown in FIG. 2A. The notch 201 has an elliptical shape. The notch 201 arranged at the position shown in FIG. 2A can make it easier for a user to perform the touch input in the notch area. FIG. 2B is a schematic diagram of a main interface of the electronic device consistent with the disclosure. FIG. 2B is intended to illustrate the notch area of display screen 200.

In certain embodiment, the notch 201 may also be an opening provided at a long side of the display screen 200 (i.e., any side of the display screen 200 while FIG. 1 shows the notch being at the top and FIG. 2A shows the notch being at the bottom).

Herein, the "upper" and "lower" of the electronic device may refer to upper and lower positions of the electronic device, when the main interface is displayed on the electronic device in a forward orientation.

Consistent with the disclosure, the display screen of the electronic device can have the notch, and the sensor can obtain the touch input of an operating entity in the notch area defined by the notch, and hence the notch area can have the touch function. The notch area of the electronic device can provide a button function, and the area other than the notch on the display screen can be used as the effective display area instead of buttons, such that the effective display area of the electronic device can be increased.

Figure 3:
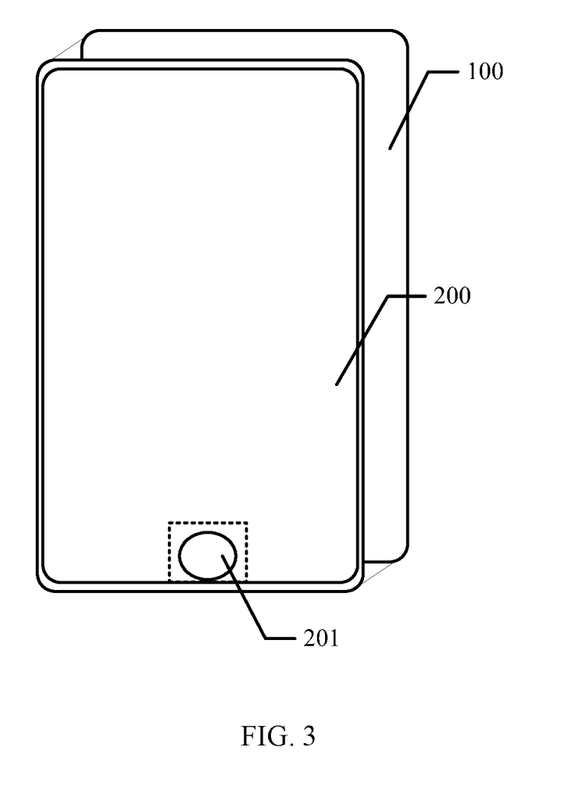
FIG. 3 is a schematic structure diagram of another electronic device according to the disclosure.

FIG. 3 is a schematic structure diagram of an electronic device consistent with the disclosure. As shown in FIG. 3, the electronic device includes the body 100, the display screen 200, and the sensor. The display screen 200 is fixedly arranged at the body 100 of the electronic device. The display screen 200 has the notch 201. The notch 201 corresponds to the notch area, and the sensor can include a touch sensor.

An acquisition area of the touch sensor covers the display screen 200 and the notch 201. A part of the acquisition area of the touch sensor corresponding to the notch 201 is a first sensing area. The first sensing area has a touch function in the notch area of the electronic device. A part of the acquisition area of the touch sensor corresponding to the display screen 200 is a second sensing area. As shown in FIG. 3, an area indicated by a dotted border box is the first sensing area, and an area other than the area indicated by the dotted border box are the second sensing area.

In some other embodiments, the acquisition area of the touch sensor can be divided into the first sensing area and the second sensing area, and the division of the acquisition area of the touch sensor can be only a logical division, but not divided on a physical structure.

The electronic device can further include a processor (not shown in FIG. 3). The processor can be configured to process the touch input of the first sensing area as a first control command, and process the touch input of the second sensing area as a second control command. The first control command can be different from the second control command. The first control command can be a control command associated with the system and the second control command can be a control command associated with a display object corresponding to a touch point of the touch input of the second sensing area.

That is, the touch sensor can detect the touch input performed by the operating entity on the display screen 200 and the touch input performed by the operating entity in the notch area. Different processing strategies can be employed for the touch input of the first sensing area and the touch input of the second sensing area. In certain embodiment, the processor can process the touch input of the first sensing area of the touch sensor as the control command associated with the system, and the processor can process the touch input of the second sensing area of the touch sensor as the control command associated with the display object corresponding to the touch point of the touch input of the second sensing area.

For example, during an operation of the electronic device, in response to the operating entity performing the touch input in the notch area, the touch input can be detected by the first sensing area of the touch sensor, and the processor can process the touch input as the control command associated with the system, for example, a control command for returning to the main interface, a control command for returning to a previous interface, or a control command for calling a task manager.

In response to the operating entity performing an input operation on the display screen 200 other than the notch, the second sensing area of the touch sensor can detect the touch input, and the processor can process the touch input as the control command associated with a first display object. The first display object is a display object corresponding to the touch point of the touch input. For example, the first display object can be an icon of an application, and the processor can process the touch input as a control command that activates the application corresponding to the first display object. As another example, the first display object can be an interface of the application, and the processor can process the touch input as a control command that closes the application, process the touch input as a control command that adjusts a size of the interface of the application, or process the touch input as a control command that controls the application to turn page. The position and shape of the notch 201 may be any one of the forms shown in FIGS. 1, 2A, and 2B.

Consistent with the disclosure, the display screen of the electronic device can have the notch, and the acquisition area of the touch sensor can cover the display screen and the notch. In response to the operating entity performing the touch input in the notch area, the processor can process the touch input as the control command associated with the system. In response to the operating entity performing the touch input on the area other than the notch on the display screen, the processor can process the touch input as the control command associated with the display object. As such, the notch area of the electronic device can have the touch function, thereby enabling the notch area of the electronic device to provide button functions associated with the system. Further, the area other than the notch in the display screen can be used as the effective display area, which can increase the effective display area of the electronic device.

In certain embodiment, as shown in FIG. 3, the electronic device includes the body 100, the display screen 200, and the sensor. The display screen 200 is fixedly arranged at the body 100 of the electronic device. The display screen 200 has the notch 201. The notch 201 corresponds to the notch area, and the sensor can include the touch sensor.

The acquisition area of the touch sensor covers the display screen 200 and the notch 201. The part of the acquisition area of the touch sensor corresponding to the notch 201 is the first sensing area. The first sensing area has the touch function in the notch area of the electronic device. The part of the acquisition area of the touch sensor corresponding to the display screen 200 is the second sensing area. As shown in FIG. 3, the area indicated by the dotted border box is the first sensing area, and the area other than the area indicated by the dotted border box are the second sensing area.

In certain embodiment, the acquisition area of the touch sensor can be divided into the first sensing area and the second sensing area, and the division of the acquisition area of the touch sensor can be only a logical division, but not divided on a physical structure.

The electronic device can further include a central processor. The touch sensor can be configured to process the touch input of the first sensing area as a control command and report the control command to the central processor. The touch sensor can be further configured to report the touch point of the touch input of the second sensing area to the central processor, such that the central processor can determine the display object corresponding to the touch point and determine the control command for the display object, according to the touch point.

That is, the touch sensor can detect the touch input performed by the operating entity on the display screen 200 and the touch input performed by the operating entity in the notch area. Different processing methods can be employed for the touch input of the first sensing area and the touch input of the second sensing area. In certain embodiment, if the first sensing area of the touch sensor detects the touch input, a processor of the touch sensor can process the touch input of the first sensing area as the control command and report the control command to the central processor, and the central processor can execute the control command. If the second sensing area of the touch sensor detects the touch input, the touch sensor can report the touch point of the touch input of the second sensing area to the central processor, and the central processor can determine the display object corresponding to the touch point and the control command for the display object, according to the touch point.

For example, during an operation of the electronic device, in response to the operating entity performing the touch input in the notch area, the touch input can be detected by the first sensing area of the touch sensor, and the processor of the touch sensor can process the touch input of the first sensing area as the control command and report the control command to the central processor. The control command can be the control command associated with the system, for example, a control command for returning to the main interface, a control command for returning to a previous interface, a control command for calling a task manager, or a control command for turning off the screen. Furthermore, the processor of the touch sensor can generate an unlock command, after the electronic device is in a lock-screen state. The touch sensor can report the unlock command to the central processor, thereby waking up the central processor, and the central processor can unlock the electronic device.

In response to the operating entity performing an input operation on the display screen 200 other than the notch, the second sensing area of the touch sensor can detect the touch input, and the touch sensor can report the touch point of the touch input to the central processor. In certain embodiment, if the operating entity performs a sliding operation, the touch sensor can report a set of the touch points to the central processor.

The central processor can determine the first display object corresponding to the touch point and determine the control command for the first display object, according to the touch point reported by the touch sensor. For example, the first display object can be the icon of the application, and the central processor can generate, according to the touch point, the control command that activates the application corresponding to the first display object. As another example, the first display object can be the interface of the application, and the central processor can generate, according to the touch point, the control command that controls the application. The position and shape of the notch 201 may be any one of the forms shown in FIGS. 1, 2A, and 2B.

Consistent with the disclosure, the display screen of the electronic device can have the notch, and the acquisition area of the touch sensor can cover the display screen and the notch. In response to the operating entity performing the touch input in the notch area, the touch sensor can process the touch input as the control command and report the control command to the central processor. In response to the operating entity performing the touch input on the area other than the notch on the display screen, the touch sensor can report the touch point of the touch input to the central processor, such that the central processor can determine the display object corresponding to the touch point, according to the touch point, and determine the control command for the first display object reported by the touch sensor. In this scenario, some works of the central processor can be performed by the touch sensor. After the electronic device is in the lock-screen state, the central processor can enter a sleep state. After the operating entity performs the touch input in the notch area, the control command can be generated by the touch sensor and reported to the central processor to wake up the central processor to perform an unlocking operation, such that the performance of the electronic device can be further optimized.

Figure 4:
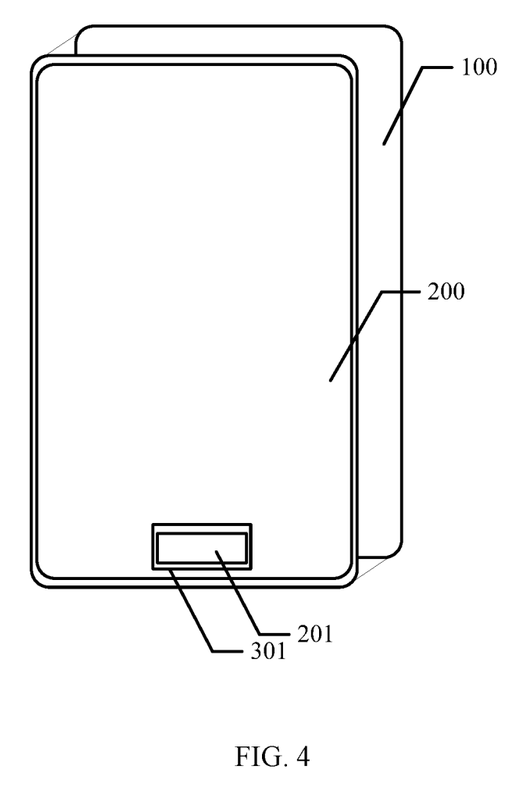
FIG. 4 is a schematic structure diagram of another electronic device according to the disclosure.

FIG. 4 is a schematic structure diagram of the electronic device consistent with the disclosure. The electronic device includes the body 100, the display screen 200, and the sensor (not shown). The display screen 200 is fixedly arranged at the body 100 of the electronic device. The display screen 200 has the notch 201. The notch 201 corresponds to the notch area, and the sensor can include a fingerprint collector 301. An acquisition area of the fingerprint collector 301 corresponds to the notch 201, such that the notch area can have the touch function and the fingerprint recognition function.

The electronic device further includes the processor. If the fingerprint collector 301 is in a first working state, and the fingerprint collector 301 can report sensing information of the touch input of the operating entity on the acquisition area to the processor, such that the processor can process the received sensing information as the control command. If the fingerprint collector 301 is in a second working state, and a fingerprint authentication can be performed, according to the sensing information of the touch input of the acquisition area, and the fingerprint authentication result can be reported to the processor.

That is, if the fingerprint collector 301 is in the first working state, the touch function of the fingerprint collector 301 can be enabled, and the fingerprint collector 301 can report the sensing information of the operation body of the acquisition area to the processor. The control command can be generated by the processor, according to the sensing information of the touch input reported by the fingerprint collector 301. The control command generated by the processor, according to the sensing information of the touch input reported by the fingerprint collector 301, can be the control command associated with the system or the control command associated with the application currently running by the electronic device.

If the fingerprint collector 301 is in the second working state, a fingerprint authentication function of the fingerprint collector 301 can be enabled, the fingerprint collector 301 can perform the fingerprint authentication, according to the sensing information of the touch input of the acquisition area, and report the fingerprint authentication result to the processor.

In certain embodiment, the working state of the fingerprint collector 301 can be determined, according to a state of the electronic device. For example, after the electronic device is in the lock-screen state or in an identity-authentication state, the fingerprint collector 301 can be switched to the second working state, such that the user can unlock the electronic device based on a fingerprint authentication and verify the user identity based on the fingerprint. After the electronic device is in a state other than the lock-screen state and the identity-authentication state, the fingerprint collector 301 can be switched to the first working state. The identity-authentication state refers to a state in which the system or application of the electronic device requires the user to perform the fingerprint authentication. For example, after the electronic device starts a payment application, the fingerprint collector 301 can be switched to the second working state, and after the payment application is closed, the fingerprint collector 301 can be switched to the first working state.

In certain embodiment, the working state of the fingerprint collector 301 can be determined according to a setting of the user. The position and shape of the notch 201 may be any one of the forms shown in FIGS. 1, 2A, and 2B.

Consistent with the disclosure, the display screen of the electronic device can have the notch, and the acquisition area of the fingerprint collector 301 can correspond to the notch. During the operation of the electronic device, the notch area of the electronic device can have the touch function and the fingerprint recognition function through adjusting the working state of the fingerprint collector. Further, the area other than the notch on the display screen can be used as the effective display area, such that the effective display area of the electronic device can be increased.

Figure 5:
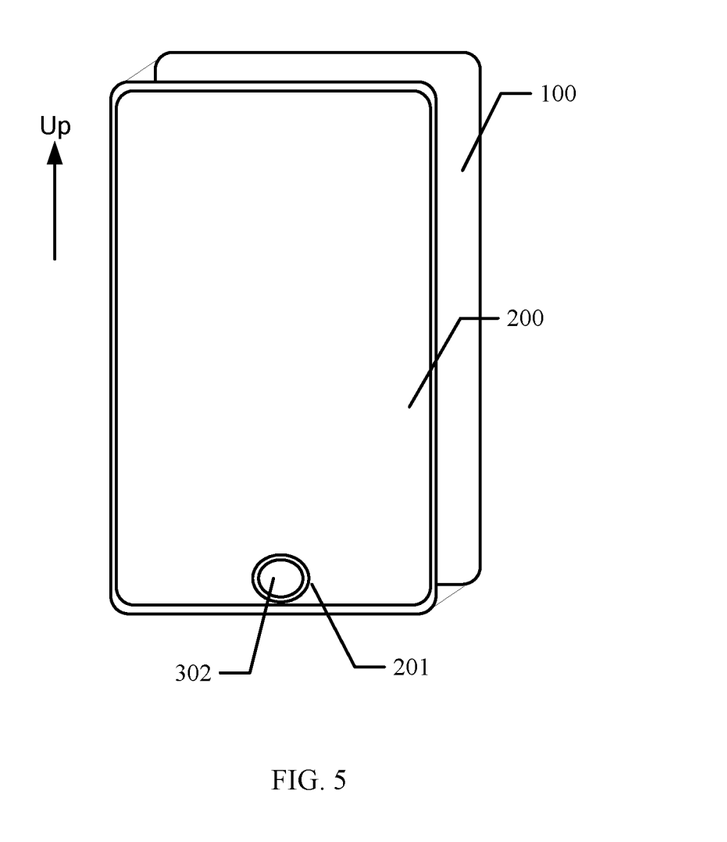
FIG. 5 is a schematic structure diagram of another electronic device according to the disclosure.

FIG. 5 is a schematic structure diagram of the electronic device consistent with the disclosure. As shown in FIG. 5, the electronic device includes the body 100, the display screen 200, and the sensor. The display screen 200 is fixedly arranged at the body 100 of the electronic device. The display screen 200 has the notch 201. The notch 201 corresponds to the notch area, and the sensor can include a camera 302. A lens of the camera 302 corresponds to the notch 201, such that the notch area can have the touch function.

The electronic device further includes the processor (not shown in FIG. 5). If the camera 302 is in the first working state, and the camera 302 can report sensing information of the touch input of the operating entity on the lens to the processor, such that the processor can process the received sensing information as the control command. If the camera 302 is in the second working state, image information can be captured via the lens, and the image information can be reported to the processor.

That is, if the camera 302 is in the first working state, the touch function of the camera 302 can be enabled, and the camera 302 can report the sensing information of the operation body of the lens to the processor. The control command can be generated by the processor, according to the sensing information of the touch input reported by the camera 302. The control command generated by the processor, according to the sensing information of the touch input reported by the camera 302, can be the control command associated with the system or the control command associated with the application currently running by the electronic device. If the camera 302 is in the second working state, the camera 302 can capture the image information via the lens, and report the image information to the processor. The position and shape of the notch 201 may be any one of the forms shown in FIGS. 1, 2A, and 2B.

In certain embodiment, the working state of the camera 302 can be determined according to the setting of the user. In some other embodiments, the working state of the camera 302 can be determined based on a spatial attitude of the electronic device.

For example, after the electronic device is in a first spatial attitude, the camera 302 can be in the first working state, and after the electronic device is in a second spatial attitude, the camera 302 can be in the second working state.

Figure 6:
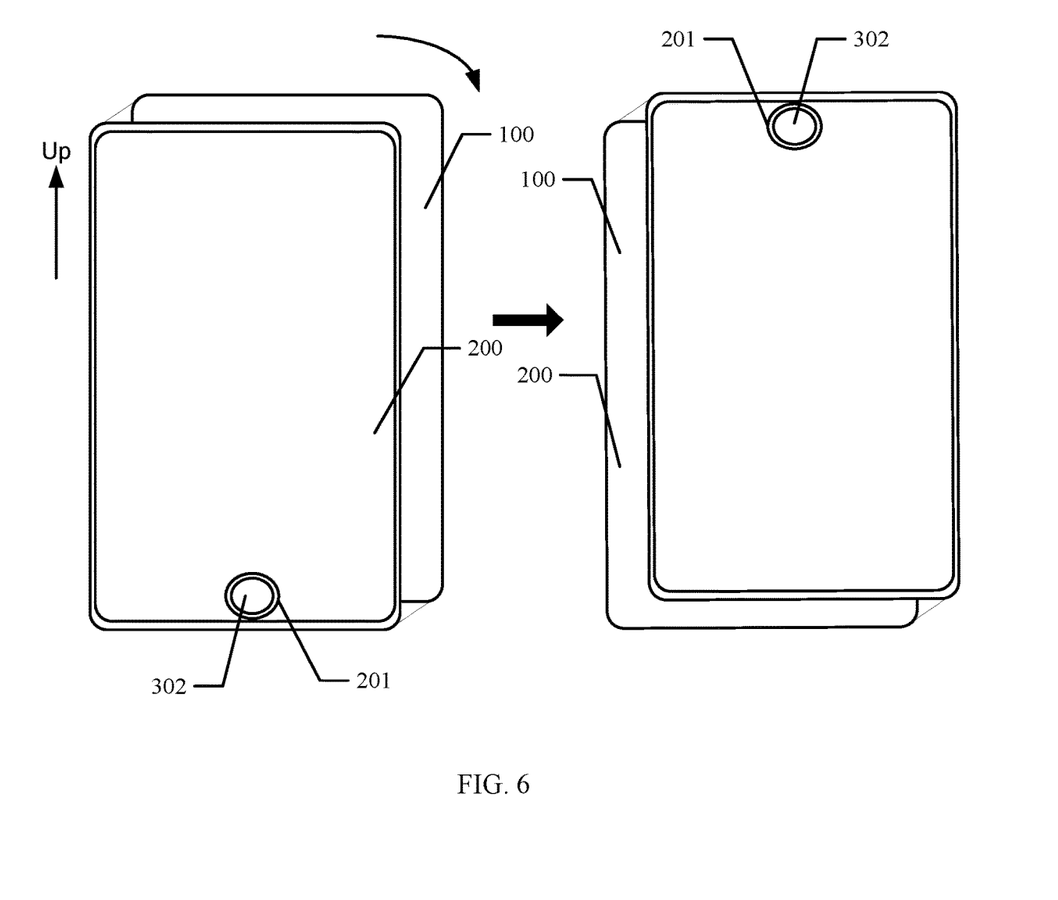
FIG. 6 schematically shows an electronic device changing from a first spatial attitude to a second spatial attitude according to the disclosure.

As shown in FIG. 5, the first spatial attitude refers to an attitude in which a spatial position of a side where the camera 302 is located is lower than a spatial position of another side opposite to the side where the camera 302 is located. The second spatial attitude refers to a spatial attitude obtained after rotating 180° from the first spatial attitude, while maintaining the display screen 200 unchanged with respect to the user. FIG. 6 schematically shows the electronic device changing from the first spatial attitude to the second spatial attitude consistent with the disclosure.

As shown in FIG. 6, after the electronic device is in the first spatial attitude, the display screen 200 can be maintained unchanged with respect to the user, and the spatial attitude obtained by rotating the electronic device 180° clockwise or 180° counterclockwise can be the second spatial attitude. FIG. 6 illustrates a process through which the electronic device can transit from the first spatial attitude to the second spatial attitude by rotating clockwise.

For example, when the user needs to shoot a photo or record a video, the electronic device can transit to the second spatial attitude. Therefore, after the electronic device is in the first spatial attitude, the camera 302 can be in the first working state, and after the electronic device is in the second spatial attitude, the camera 302 can be in the second working state.

In certain embodiment, in response to the notch 201 being arranged at a short side of the electronic device and the notch being arranged at the lower part of the body 100, the working state of the camera 302 can be determined based on the spatial attitude of the electronic device and the functional requirements of the electronic device.

For example, after the electronic device is in the first spatial attitude and does not have the shooting requirement, the camera 302 can be in the first working state, and after the electronic device is in the second spatial attitude and has the shooting requirement, the camera 302 can be in the second working state. The electronic device having the shooting requirement refers to that a camera application of the electronic device is activated.

That is, if the electronic device is in the first spatial attitude and the camera application is not activated, the camera 302 can be in the first working state, and the touch function can be enabled. If the electronic device transits to the second spatial attitude and the camera application is activated, the camera 302 can be in the second operational state.

Furthermore, after the camera 302 is in the second working state, if the spatial attitude of the electronic device changes and the electronic device still has the shooting requirement, the camera 302 can continue to be in the second working state until the electronic device is not in the second spatial attitude and does not have the shooting requirement, the camera can switch to the first working state.

That is, if the electronic device switches to the second spatial attitude and the camera application is activated, the camera 302 can be in the second working state, and then, if the spatial attitude of the electronic device changes, but the camera application is still activated, the camera 302 can continue to be in the second working state until the electronic device is not in the second spatial attitude and the camera application is turned off, and the camera 302 can switch to the first working state.

The camera 302 may be implemented in various structures. In certain embodiment, in a first structure of the camera 302, a plurality of transparent electrodes can be arranged on an inner surface of a protective glass of the lens of the camera 302. After the plurality of transparent electrodes are in the enabled state, the touch input of the operating entity at a surface of the protective glass or at a preset distance from the surface of the protective glass can be detected.

After the camera 302 is in the first working state, the plurality of transparent electrodes can be in the enabled state, and the touch function can be implemented based on the plurality of transparent electrodes.

In certain embodiment, in a second structure of the camera 302, the camera 302 can include a light source. The light source can be configured to illuminate the protective glass of the lens of the camera 302. In response to the operating entity touching the protective glass, the light source can emit a light beam projected onto a contact surface of the operating entity on the protective glass, such that the lens of the camera 302 can obtain the image information of the contact surface of the operating entity. After the camera 302 is in the first working state, the light source of the camera 302 can be in the enabled state.

A processor of the camera 302 can analyze the image information of the operating entity on the contact surface, and hence obtain the sensing information of the touch input, for example, a click operation performed by the operating entity and a sliding operation performed by the operating entity.

In certain embodiment, a plurality of light sources can be arranged inside the protective glass of the lens of the camera 302. The plurality of light sources may be arranged in a ring shape to provide a better fill-in light effect, thereby obtaining clearer image information of the operating entity.

In certain embodiment, the camera 302 can include a lens with a macro-shooting function. In this scenario, in response to the operating entity being close to the protective glass of the camera 302 (for the first structure and the second structure of the camera 302 described above) or an outer surface of the protective glass (for the second structure of the camera 302 described above), the captured image information of the operating entity can contain more detailed information.

The fingerprint collector 301 can be implemented by a camera having the above-described structures. That is, the fingerprint authentication can be directly performed using a macro image of a finger, and an accuracy of fingerprint authentication can be higher than that of the conventional fingerprint collector.

In certain embodiment, when the camera includes the lens having the macro-shooting function, the camera 302 can be in the first working state, the second working state, or a third working state. The processing procedure of the camera 302 in the first working state and the second working state are similar to the foregoing, and the processing procedure of the camera 302 in the third working state will be described below.

After the camera 302 is in the third working state, the macro image of the finger can be collected by the lens, and the fingerprint can be authenticated, according to the captured macro image of the finger, and thus a fingerprint authentication result can be reported to the processor.

Based on the above-described scheme for determining the working state of the camera 302, after receiving a preset switching command, the camera 302 can be switched to the third working state, or after the electronic device is in the lock-screen state or the identity-authentication state, the camera 302 can be switched to the third working state.

Consistent with the disclosure, the display screen of the electronic device can have the notch, and the lens of the camera can correspond to the notch. During the operation of the electronic device, the notch area of the electronic device can have both the touch function and the shooting function through switching the working state of the camera. Furthermore, the area other than the notch on the display screen can be used as the effective display area, such that the effective display area of the electronic device can be increased.

Figure 7:
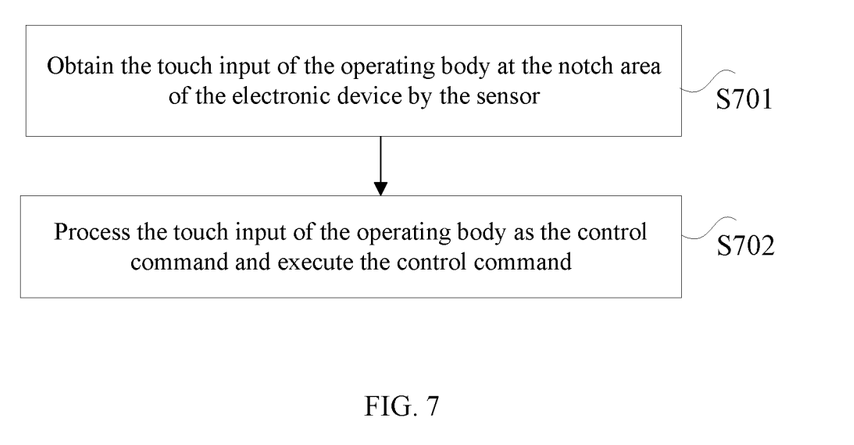
FIG. 7 is a flow chart of a control method according to the disclosure.

FIG. 7 is a flow chart of a control method consistent with the disclosure. The control method can be implemented by the above-described electronic device. As shown in FIG. 7, the control method may include the followings.

At S701, the touch input of the operating entity at the notch area of the electronic device is obtained by the sensor.

At S702, the touch input of the operating entity is processed as the control command and the control command is executed.

Consistent with the disclosure, the display screen of the electronic device can have the notch, and the sensor can obtain the touch input of the operating entity at the notch area defined by the notch. On the basis of the control method, during the operation of the electronic device, the sensor can obtain the touch input of the operating entity at the notch area, the touch input can be processed as the control command, and the control command can be executed. As such, the notch area of the electronic device can have the touch function, thereby enabling the notch area of the electronic device to provide the button function. Furthermore, the area other than the notch in the display screen can be used as the effective display area, which can increase the effective display area of the electronic device.

In certain embodiment, when the sensor of the electronic device includes the above-described touch sensor, at S702, the touch input of the operating entity can be processed as the corresponding control command and the control command can be executed.

For example, the touch input of the first sensing area can be processed as the first control command and the first control command can be executed. The touch input of the second sensing area can be processed as the second control command and the second control command can be executed.

The first control command can be different from the second control command. The first control command can be the control command associated with the system and the second control command can be the control command associated with the display object corresponding to the touch point of the touch input of the second sensing area.

In certain embodiment, when the sensor of the electronic device includes the above-described touch sensor, at S702, the touch input of the operating entity can be processed as the corresponding control command and the control command can be executed.

For example, the touch sensor can process the touch input of the first sensing area as the control command and report the control command to the central processor, and the central processor can execute the control command. The touch sensor can report the touch point of the touch input of the second sensing area to the central processor, the central processor can determine the display object corresponding to the touch point and the control command for the display object, according to the touch point, and the central processor can execute the control command.

In certain embodiment, when the sensor of the electronic device includes the above-described fingerprint collector, at S702, the touch input of the operating entity can be processed as the corresponding control command and the control command can be executed.

For example, if the fingerprint collector is in the first working state, and the sensing information of the touch input of the operating entity on the acquisition area can be sent to the processor, such that the processor can process the received sensing information as the control command. If the fingerprint collector is in the second working state, and the fingerprint authentication can be performed, according to the sensing information of the touch input of the acquisition area, and the fingerprint authentication result can be reported to the processor.

As another example, the working state of the fingerprint collector can be determined, according to the state of the electronic device. For example, after the electronic device is in the lock-screen state or in the identity-authentication state, the fingerprint collector can be switched to the second working state, such that the user can unlock the electronic device based on the fingerprint authentication and verify the user identity based on the fingerprint. After the electronic device is in a state other than the lock-screen state and the identity-authentication state, the fingerprint collector can be switched to the first working state. The identity-authentication state refers to a state in which the system or application of the electronic device requires the user to perform the fingerprint authentication.

In certain embodiment, when the sensor of the electronic device includes the above-described camera, at S702, the touch input of the operating entity can be processed as the corresponding control command and the control command can be executed.

For example, if the camera is in the first working state, the sensing information of the touch input of the operating entity on the lens can be reported to the processor, and the processor can process the received sensing information as the control command. If the camera is in the second working state, the image information can be captured via the lens, and the image information can be reported to the processor.

As another example, the working state of the camera can be determined based on the spatial attitude of the electronic device. For example, after the electronic device is in the first spatial attitude, the camera can be in the first working state, and after the electronic device is in the second spatial attitude, the camera can be in the second working state.

The first spatial attitude refers to the attitude in which the spatial position of the side where the camera is located is lower than the spatial position of another side opposite to the side where the camera is located. The second spatial attitude refers to the spatial attitude obtained after rotating 180° from the first spatial attitude, while maintaining the display screen unchanged with respect to the user.

Figure 8:
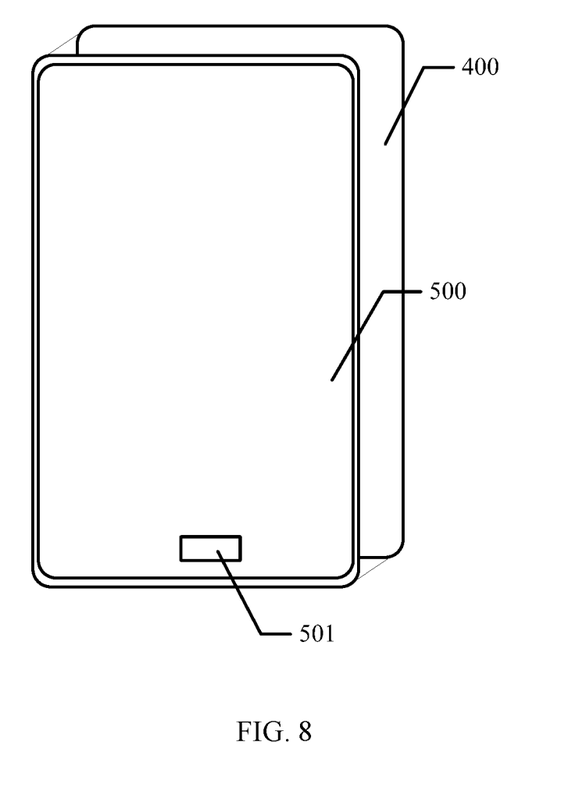
FIG. 8 is a schematic structure diagram of another electronic device according to the disclosure.

FIG. 8 is a schematic structure diagram of the electronic device consistent with the disclosure. As shown in FIG. 8, the electronic device includes a body 400, a display screen 500, a notch 501, and a sensor. The display screen 500 can be fixedly arranged at the body 400 of the electronic device. The notch 501 defines a notch area. At least a part of the sensor can be arranged at the notch 501. The notch area can have the touch function and another function different from the touch function through the sensor. That is, the sensing area of the sensor at least partially overlaps the notch area.

As shown in FIG. 8, the notch 501 is an opening at a short side of the display screen 500, and the notch 501 is located at a lower part of the body 400. As shown in FIG. 8, the notch 501 has a rectangular shape. In certain embodiment, the position and shape of the notch 501 are not limited to those shown in FIG. 8.

In certain embodiment, the notch 501 can be the opening at the short side of the display screen 500, and the notch 501 can be located at an upper part of the body 400. In some other embodiments, the notch 501 can be the opening at a long side of the display screen 500.

Consistent with the disclosure, the display screen of the electronic device can have the notch and at least a part of the sensor can be arranged at the notch. Due to the function of the sensor, the notch area of the electronic device can have both the touch function and another function, such that the notch area of the electronic device can provide the button function. Furthermore, the area other than the notch on the display screen can be used as the effective display area, such that the effective display area of the electronic device can be increased.

As another example, the sensor can include the camera. The lens of the camera corresponds to the notch. If the camera is in the first working state, the notch area can have the touch function, and if the camera is in the second working state, the notch area can have an image capturing function.

For example, if the camera is in the first working state, and the sensing information of the touch input of the operating entity on the lens can be reported to the processor, such that the processor can process the sensing information as the control command. If the camera is in the second working state, the image information can be captured via the lens, and the image information can be reported to the processor.

In certain embodiment, the working state of the camera can be determined according to the setting of the user. In some other embodiments, the working state of the camera can be determined based on the spatial attitude of the electronic device. For example, after the electronic device is in the first spatial attitude, the camera can be in the first working state, and after the electronic device is in the second spatial attitude, the camera can be in the second working state.

The first spatial attitude refers to an attitude in which a spatial position of a side where the camera is located is lower than a spatial position of another side opposite to the side where the camera is located. The second spatial attitude refers to a spatial attitude obtained after rotating 180° from the first spatial attitude, while maintaining the display screen 400 unchanged with respect to the user. The first spatial attitude and the second spatial attitude are shown in FIG. 6.

The structure of the camera may be similar to those described in previous sections. Further, the sensor can include the fingerprint collector. The acquisition area of the fingerprint collector corresponds to the notch, such that the notch area can have the touch function and the fingerprint recognition function.

For example, if the fingerprint collector is in the first working state, and the sensing information of the touch input of the operating entity on the acquisition area can be reported to the processor, such that the processor can process the received sensing information as the control command. If the fingerprint collector is in the second working state, and the fingerprint authentication can be performed, according to the sensing information of the touch input of the acquisition area, and the fingerprint authentication result can be reported to the processor.

In certain embodiment, the working state of the fingerprint collector can be determined according to the setting of the user. In some other embodiments, the working state of the fingerprint collector can be determined, according to the state of the electronic device. For example, after the electronic device is in the lock-screen state or in the identity-authentication state, the fingerprint collector can be switched to the second working state, such that the user can unlock the electronic device based on the fingerprint authentication and verify the user identity based on the fingerprint. After the electronic device is in a state other than the lock-screen state and the identity-authentication state, the fingerprint collector can be switched to the first working state. The identity-authentication state refers to a state in which the system or application of the electronic device requires the user to perform the fingerprint authentication.

Figure 9:
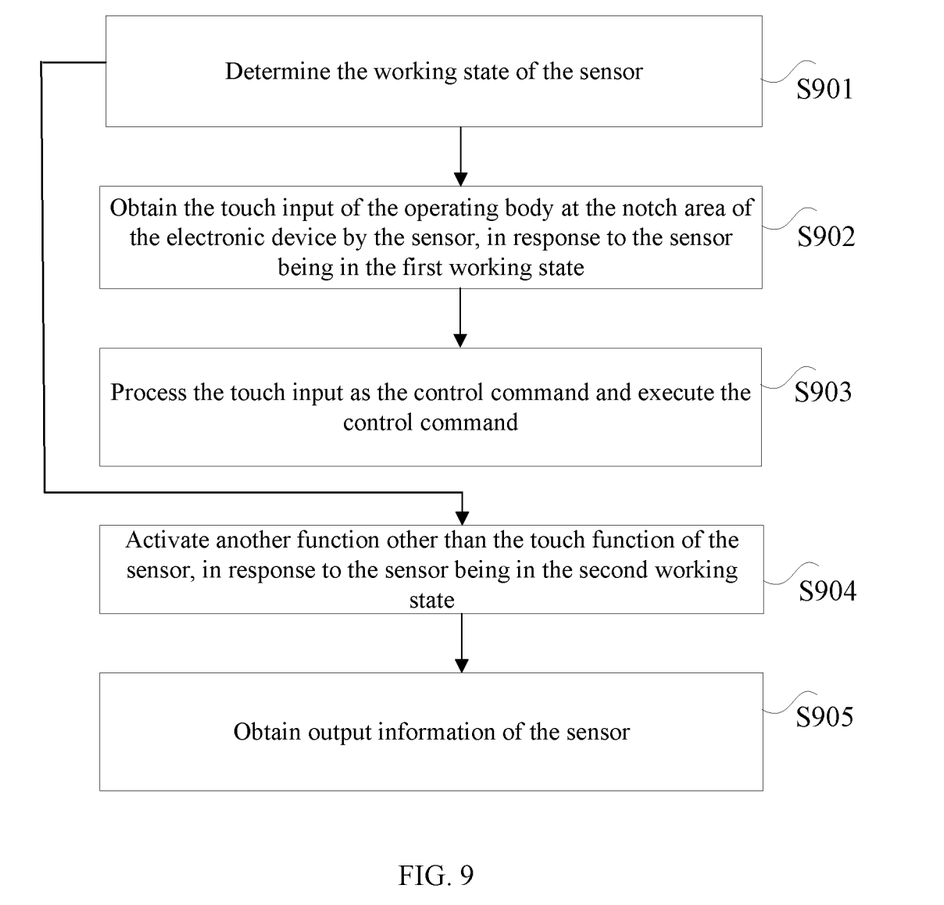
FIG. 9 is a flow chart of another control method according to the disclosure.

FIG. 9 is a flow chart of the control method consistent with the disclosure. The control method can be implemented by the electronic device shown in FIG. 8. As shown in FIG. 9, the control method may include the followings.

At S901, the working state of the sensor is determined.

At S902, the touch input of the operating entity at the notch area of the electronic device is obtained by the sensor, in response to the sensor being in the first working state.

At S903, the touch input is processed as the control command and the control command is executed.

At S904, another function other than the touch function is activated other than the touch function of the sensor, in response to the sensor being in the second working state.

At S905, output information of the sensor is obtained.

Consistent with the disclosure, during the operation of the electronic device, the notch area of the electronic device can have both the touch function and another function through switching the working state of the sensor, such that the notch area of the electronic device can provide the button function. Furthermore, the area other than the notch on the display screen can be used as the effective display area, such that the effective display area of the electronic device can be increased.

When the sensor of the electronic device includes the camera, in response to the sensor being in the first working state, the touch input of the operating entity at the notch area of the electronic device can be obtained by the sensor, the touch input can be processed as the control command, and the control command can be executed. For example, in response to the camera being in the first working state, and the sensing information of the touch input of the operating entity on the lens can be reported to the processor, and the processor can process the sensing information as the control command and execute the control command. In response to the camera being in the second working state, another function of the sensor other than the touch function can be activated to obtain the output information of the sensor. For example, in response to the camera being in the second working state, the image information can be captured via the lens, and the image information can be reported to the processor.

In certain embodiment, the working state of the camera can be determined according to the setting of the user. In some other embodiments, the working state of the camera can be determined based on the spatial attitude of the electronic device. For example, after the electronic device is in the first spatial attitude, the camera can be in the first working state, and after the electronic device is in the second spatial attitude, the camera can be in the second working state.

The first spatial attitude refers to an attitude in which a spatial position of a side where the camera is located is lower than a spatial position of another side opposite to the side where the camera is located. The second spatial attitude refers to a spatial attitude obtained after rotating 180° from the first spatial attitude, while maintaining the display screen 400 unchanged with respect to the user.

When the sensor of the electronic device includes the fingerprint collector, in response to the sensor being in the first working state, the touch input of the operating entity at the notch area of the electronic device can be obtained by the sensor, the touch input can be processed as the corresponding control command, and the control command can be executed. For example, in response to the fingerprint collector being in the first working state, and the sensing information of the touch input of the operating entity on the acquisition area can be reported to the processor, and the processor can process the received sensing information as the control command and execute the control command. In response to the camera being in the second working state, another function of the sensor other than the touch function can be activated to obtain the output information of the sensor. For example, in response to the camera being in the second working state, the fingerprint authentication can be performed, according to the sensing information of the touch input of the acquisition area, and the fingerprint authentication result can be reported to the processor.

In certain embodiment, the working state of the fingerprint collector can be determined according to the setting of the user. In some other embodiments, the working state of the fingerprint collector can be determined, according to the state of the electronic device. For example, after the electronic device is in the lock-screen state or in the identity-authentication state, the fingerprint collector can be switched to the second working state, such that the user can unlock the electronic device based on the fingerprint authentication and verify the user identity based on the fingerprint. After the electronic device is in a state other than the lock-screen state and the identity-authentication state, the fingerprint collector can be switched to the first working state. The identity-authentication state refers to a state in which the system or application of the electronic device requires the user to perform the fingerprint authentication.

Consistent with the disclosure, the display screen of the electronic device can have the notch, and the sensor can obtain the touch input of the operating entity at the notch area defined by the notch, such that the notch area of the electronic device can provide the button function. Furthermore, the area other than the notch on the display screen can be used as the effective display area, such that the effective display area of the electronic device can be increased.

In this specification, relationship terms, such as "first," "second," and the like, are used merely to distinguish an entity or operation from another entity or operation, but are not intended to require or imply that there is any such physical relationship or sequence between these entities or operations. Moreover, the terms "comprising," "including," or any other variations thereof are intended to encompass a non-exclusive inclusion. Therefore, the process, method, article, or apparatus, which includes a series of elements, includes not only those elements but also other elements that are not explicitly listed or the elements inherent in such processes, methods, articles, or apparatus. In the absence of more restrictions, the elements defined by the statement "including a . . . " do not preclude the presence of additional elements in the process, method, article, or apparatus including the elements.

In the present specification, the embodiments are described in a gradual and progressive manner with the emphasis of each embodiment on an aspect different from other embodiments. The same or similar parts among the various embodiments may refer to each other. Since the disclosed apparatus according to the embodiment corresponds to the disclosed method according to the embodiment, detailed description of the disclosed apparatus is omitted, and reference can be made to the description of the methods for a description of the relevant parts of the apparatus.

The foregoing description of the disclosed embodiments will enable a person skilled in the art to realize or use the present disclosure. Various modifications to the embodiments will be apparent to those skilled in the art. The general principles defined herein may be implemented in other embodiments without departing from the spirit or scope of the disclosure. Accordingly, the disclosure will not be limited to the embodiments shown herein, but is to meet the broadest scope consistent with the principles and novel features disclosed herein.

What is claimed is:

1. An electronic device comprising:
a body;
a display screen and a notch defining a notch area fixedly arranged in relation to the body;
a sensor deposited at the notch area, the sensor comprising,
in a first working state, a touch sensor configured to obtain a touch input of an operating entity;
in a second working state, a camera, configured to capture image information;
a processor configured to switch the sensor between the first working state and the second working state, and to process correspondingly the touch input as a control command and the image information,
wherein, in the first working state, the camera includes a light source configured to illuminate a contact surface of the operating entity to obtain image information of the contact surface of the operating entity, and, in the second working state, a plurality of transparent electrodes of the camera are enabled to capture the image information.

2. The electronic device according to claim 1, wherein: the notch is an opening at a short side of the display screen and is located at an upper part of the body.

3. The electronic device according to claim 2, wherein, the processor is configured to switch the sensor between the first working state and the second working state correspondingly in response to the electronic device being in a first spatial attitude and in a second spatial attitude;
the first spatial attitude refers to an attitude in which a spatial position of a side where the camera is located is lower than a spatial position of another side opposite to the side where the camera is located; and
the second spatial attitude refers to a spatial attitude obtained after rotating 180° from the first spatial attitude, while maintaining the display screen unchanged with respect to a user.

4. The electronic device according to claim 1, wherein:
an acquisition area of the touch sensor covers the display screen and the notch, a part of the acquisition area of the touch sensor corresponding to the notch is a first sensing area, and a part of the acquisition area of the touch sensor corresponding to the display screen is a second sensing area; and
the processor configured to process the touch input of the first sensing area as a first control command and process the touch input of the second sensing area as a second control command, the first control command being different from the second control command, the first control command being a control command associated with a system, and the second control command being a control command associated with a display object corresponding to a touch point of the touch input of the second sensing area.

5. The electronic device according to claim 1, wherein:
an acquisition area of the touch sensor covers the display screen and the notch, a part of the acquisition area of the touch sensor corresponding to the notch is a first sensing area, and a part of the acquisition area of the touch sensor corresponding to the display screen is a second sensing area; and
the touch sensor is configured to process the touch input of the first sensing area as a control command and report the control command to the central processor;
the touch sensor is further configured to report the touch point of the touch input of the second sensing area to the central processor, such that the central processor determines the display object corresponding to the touch point and determines the control command for the display object, according to the touch point.

6. The electronic device according to claim 1, wherein:
the touch sensor is a fingerprint collector; and
an acquisition area of the fingerprint collector corresponds to the notch, such that the notch area has a touch function and a fingerprint recognition function.

7. The electronic device according to claim 1, wherein:
the camera includes a lens which corresponds to the notch, such that the notch area has the touch function.

8. The electronic device according to claim 1, wherein:
a plurality of transparent electrodes are arranged on an inner surface of a protective glass of the lens of the camera, and the camera being in the first working state refers to the plurality of transparent electrodes are in an enabled state.

9. An electronic device, comprising:
a body;
a display screen and a notch defining a notch area fixedly arranged in relation to the body;
a sensor, wherein at least a part of the sensor is arranged at the notch area, the sensor comprising,
in a first working state, a touch sensor configured to obtain a touch input of an operating entity; and
in a second working state, a camera, configured to capture image information;
a processor configured to switch the sensor between the first working state and the second working state, and to process correspondingly the touch input as a control command and the image information,
wherein, in the first working state, the camera includes a light source configured to illuminate a contact surface of the operating entity to obtain image information of the contact surface of the operating entity, and, in the second working state, a plurality of transparent electrodes of the camera are enabled to capture the image information.

10. The electronic device according to claim 9, wherein:
in response to the sensor being in the first working state, the notch area has a touch function; and
in response to the sensor being in the second working state, the notch area has an image capturing function.

11. The electronic device according to claim 9, wherein the processor configured to switch the sensor between the first working state and the second working state correspondingly and in response to the electronic device being in a first spatial attitude, the sensor is in the first working state; in response to the electronic device being in a second spatial attitude, the sensor is in the second working state;
wherein,
the first spatial attitude refers to an attitude in which a spatial position of a side where the camera is located is lower than a spatial position of another side opposite to the side where the camera is located; and the second spatial attitude refers to a spatial attitude obtained after rotating 180° from the first spatial attitude, while maintaining the display screen unchanged with respect to a user.

12. A method of controlling an electronic device, the method comprising:

determining a first working state or a second working state of a sensor arranged at a notch area of the electronic device;

in the first working state, obtaining, by the sensor, a touch input of an operating entity at the notch area of the electronic device and, in response to the touch input, providing, by the sensor, a light source configured to illuminate a contact surface of the operating entity;

in the second working state, enabling a plurality of transparent electrodes of the sensor and capturing image information, by the sensor; and processing correspondingly the touch input as a control command and the image information.

13. The method according to claim 12, wherein:
the working state of the sensor is determined according to a setting of a user.

14. The method according to claim 12, wherein:
the working state of the sensor is determined according to a spatial attitude of the electronic device.

15. The method according to claim 14, wherein:
in response to the electronic device being in a first spatial attitude, the sensor is in a first working state; and
in response to the electronic device being in a second spatial attitude, the sensor is in a second working state.

* * * * *